United States Patent Office.

JOHN GARDNER, OF NEW HAVEN, CONNECTICUT, ASSIGNOR TO SAMUEL PECK AND COMPANY.

Letters Patent No. 76,623, dated April 14, 1868.

IMPROVEMENT IN THE MANUFACTURE OF MELODEON-STOPS AND OTHER ARTICLES.

The Schedule referred to in these Letters Patent and making part of the same.

TO WHOM IT MAY CONCERN:

Be it known that I, JOHN GARDNER, of New Haven, in the county of New Haven, and State of Connecticut, have invented certain new and useful Improvements in the Method of Applying a Certain Composition of Matter to the Useful Arts; and I hereby declare the following to be a full, clear, and exact description of the same.

The composition of matter, of which the articles hereinafter specified are made, is composed of gum-shellac and ivory-dust, or its equivalent in fibrous matter, taken in about equal parts, with coloring-matter in sufficient quantity to give the composition the shade desired.

The shellac is first cut up or dissolved in alcohol or other liquid that will dissolve the gum, and is then mixed thoroughly with the ivory-dust and coloring-matter, after which the mixture is dried.

The composition thus produced is of special value in the manufacture of melodeon-stops, knobs for bureaus, drawers, picture-nails, curtains, &c.

It is to be used for this purpose in the following manner: The dried composition above named is pulverized or ground to a fine powder, with which a mould or die of suitable shape is filled. After this has been done, the die is subjected to sufficient heat to melt and run together the composition, which fills the interior of the mould or die, and takes its shape. When the die is suffered to cool, the composition will harden, and comes out of the die in the form of a knob or stop of the shape desired.

Ornaments of various colors may be formed on the knob or stop by cutting or countersinking or engraving in the mould the necessary figures. The recesses thus formed are filled with the composition-dust, of the color desired, and upon top of this is placed the composition-dust which forms the body of the article to be produced. When the composition knob is taken from the mould, the ornamental figures in the mould will be found reproduced in relief on the knob, in the color possessed by the composition placed in the figures or recesses in the mould.

In these knobs, a screw-shank, or other suitable device for attaching the same to the article with which they are to be used, may be pressed at the time the knobs are moulded.

A knob or stop made of this composition possesses great strength and beauty. The mode described admits of raised letters, of a color different from that of the body of the knob, being formed on the head of the same, and in this manner knobs for apothecaries' drawers may have formed on them the names of the drugs contained in the drawers to which they are attached. And in like manner melodeon or organ-stops may carry the names of the set of pipes which they regulate.

Having now described my invention, and the manner in which the same is or may be carried into effect, what I claim, and desire to secure by Letters Patent, is—

The method of forming the ingredients herein named into melodeon-stops, knobs, or like articles, with raised letters or ornamentations of a color different from that of which the body of such articles is formed, substantially in the manner and by the means herein specified.

JOHN GARDNER.

Witnesses:
HENRY T. BLAKE,
E. K. BLAKE.